United States Patent Office 3,836,528
Patented Sept. 17, 1974

3,836,528
α-(5-NITRO-2-FURYL) NITRONES
Shinsaku Minami, Yamato-Kouriyama, Jun-Ichi Matsumoto, Osaka, Masanao Shimizu, Kobe, and Yoshiyuki Takase, Amagasaki, Japan, assignors to Dainippon Pharmaceutical Co., Ltd., Osaka, Japan
No Drawing. Continuation-in-part of application Ser. No. 746,749, July 23, 1968, now Patent No. 3,701,773, which is a continuation-in-part of abandoned application Ser. No. 592,265, Nov. 7, 1966. This application Mar. 7, 1972, Ser. No. 232,634
The portion of the term of the patent subsequent to May 30, 1989, has been disclaimed
Int. Cl. C07d 5/30
U.S. Cl. 260—240 A         11 Claims

ABSTRACT OF THE DISCLOSURE

Nitrone derivatives having anti-microbial activity comprising compounds of the formula

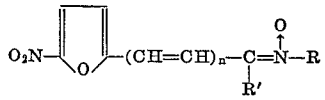

wherein $n$ is 0 or 1, $R^1$ is an alkyl of 1 to 4 carbon atoms, R is a member selected from the group consisting of A—$(OH)_m$ and A—X, wherein A is an alkyl having 1 to 6 carbon atoms, X is a member selected from the group consisting of hydrogen and furyl, and $m$ is an integer of 1 to 3 when $n$ is 1 and an integer of 2 or 3 when $n$ is 0.

---

This application is a continuation-in-part of application Ser. No. 746,749, filed July 23, 1968, now U.S. Pat. 3,701,773 which in turn is a continuation-in-part of application Ser. No. 592,265, filed Nov. 7, 1966, now abandoned.

The present invention is directed to novel nitrone derivatives having excellent antimicrobial activity.

Heretofore, some of the N-substituted (5-nitro-2-furfurylidene) amine compounds have been known as substances having antimicrobial activity. It has been noticed, however, that the antimicrobial activities of many of these compounds are not high enough to be satisfactory.

The principal object of the present invention therefore is to offer a novel compound having excellent anti-bacterial, anti-fungal and antiprotozoal activities.

Still other objects and advantages of the present invention will be more apparent from the following description of the present invention.

The present invention relates to nitrone derivatives represented by the general formula:

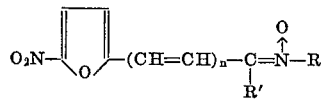

wherein $n$ is 0 or 1, $R^1$ is an alkyl of 1 to 4 carbon atoms, R is a member selected from the group consisting of A—$(OH)_m$ and A—X, wherein A is an alkyl having 1 to 6 carbon atoms, X is a member selected from the group consisting of hydrogen and furyl, and $m$ is an integer of 1 to 3 when $n$ is 1 and an integer of 2 or 3 when $n$ is 0.

To exemplify suitable members for R in the above formula, the following are mentioned: methyl, ethyl, n- and iso-propyl, n- and iso-butyl, n-hexyl, 1-methyl-2-hydroxyethyl, 2-methyl-2-hydroxyethyl, 2-hydroxyethyl, 2-hydroxypropyl, 2-hydroxy-1-(hydroxymethyl)ethyl, 2-furfuryl, etc.

R' in the above formula is selected from methyl, ethyl, n- and iso-propyl and m- and iso-butyl.

The following are exemplary especially suitable compounds of the present invention:
α-methyl-α-(5-nitro-2-furyl)-N-methyl nitrone,
α-methyl-α-(5-nitro-2-furyl)-N-ethyl nitrone,
α-methyl-α-(5-nitro-2-furyl)-N-(2-hydroxypropyl) nitrone,
α-methyl-α-(5-nitro-2-furyl)-N-(2-hydroxyethyl) nitrone,
α-methyl-α-(5-nitro-2-furyl)-N-(1-methyl-2-hydroxyethyl) nitrone,
α-methyl-α-[2-(5-nitro-2-furyl)vinyl]-N-methyl nitrone,
α-methyl-α-[2-(5-nitro-2-furyl)vinyl]-N-(2-hydroxyethyl) nitrone,
α-methyl-α-[2-(5-nitro-2-furyl)vinyl]-N-(1-methyl-2-hydroxyethyl) nitrone,
α-methyl-α-[2-(5-nitro-2-furyl)vinyl]-N-(2-hydroxypropyl) nitrone,
α-methyl-α-[2-(5-nitro-2-furyl)vinyl]-N-[2-hydroxy-1-(hydroxymethyl)ethyl] nitrone,
α-methyl-α-(5-nitro-2-furyl)-N-(2-furfuryl) nitrone,
α-methyl-α-[2-(5-nitro-2-furyl)vinyl]-N-(2-furfuryl) nitrone,
α-ethyl-α-(5-nitro-2-furyl)-N-methyl nitrone,
α-ethyl-α-(5-nitro-2-furyl)-N-ethyl nitrone,
α-ethyl-α-(5-nitro-2-furyl)-N-(2-hydroxypropyl) nitrone,
α-ethyl-α-(5-nitro-2-furyl)-N-(2-hydroxyethyl) nitrone,
α-ethyl-α-(5-nitro-2-furyl)-N-(1-methyl-2-hydroxyethyl) nitrone,
α-ethyl-α-[2-(5-nitro-2-furyl)vinyl]-N-methyl nitrone,
α-ethyl-α-[2-(5-nitro-2-furyl)]-N-(2-hydroxyethyl) nitrone,
α-ethyl-α-[2-(5-nitro-2-furyl)vinyl]-N-(1-methyl-2-hydroxyethyl) nitrone,
α-ethyl-α-[2-(5-nitro-2-furyl)vinyl]-N-(2-hydroxypropyl) nitrone,
α-ethyl-α-[2-(5-nitro-2-furyl)vinyl]-N-[2-hydroxy-1-(hydroxymethyl)ethyl] nitrone,
α-ethyl-α-(5-nitro-2-furyl)-N-(2-furfuryl) nitrone,
α-ethyl-α-[2-(5-nitro-2-furyl)vinyl]-N-(2-furfuryl) nitrone,
α-n-propyl-α-(5-nitro-2-furyl)-N-methyl nitrone,
α-n-propyl-α-(5-nitro-2-furyl)-N-ethyl nitrone,
α-n-propyl-α-(5-nitro-2-furyl)-N-(2-hydroxypropyl) nitrone,
α-n-propyl-α-(5-nitro-2-furyl)-N-(2-hydroxyethyl) nitrone,
α-n-propyl-α-(5-nitro-2-furyl)-N-(1-methyl-2-hydroxyethyl) nitrone,
α-n-propyl-α-[2-(5-nitro-2-furyl)vinyl]-N-methyl nitrone,
α-n-propyl-α-[2-(5-nitro-2-furyl)vinyl]-N-(2-hydroxyethyl) nitrone,
α-n-propyl-α-[2-(5-nitro-2-furyl)vinyl]-N-(1-methyl-2-hydroxyethyl) nitrone,
α-n-propyl-α-[2-(5-nitro-2-furyl)vinyl]-N-(2-hydroxypropyl) nitrone,
α-n-propyl-α-[2-(5-nitro-2-furyl)vinyl]-N-[2-hydroxy-1-(hydroxymethyl)ethyl] nitrone,
α-n-propyl-α-(5-nitro-2-furyl)-N-(2-furfuryl) nitrone,
α-n-propyl-α-[2-(5-nitro-2-furyl)-vinyl]-N-(2-furfuryl) nitrone,
α-iso-propyl-α-(5-nitro-2-furyl)-N-methyl nitrone,
α-iso-propyl-α-(5-nitro-2-furyl)-N-ethyl nitrone,
α-iso-propyl-α-(5-nitro-2-furyl)-N-(2-hydroxypropyl) nitrone,
α-iso-propyl-α-(5-nitro-2-furyl)-N-(2-hydroxyethyl) nitrone,
α-iso-propyl-α-(5-nitro-2-furyl)-N-(1-methyl-2-hydroxyethyl) nitrone,
α-iso-propyl-α-[2-(5-nitro-2-furyl)vinyl]-N-methyl nitrone, α-iso-propyl-α-[2-(5-nitro-2-furyl)vinyl]-N-(2-hydroxyethyl) nitrone,
α-iso-propyl-α-[2-(5-nitro-2-furyl)vinyl]-N-(1-methyl-2-hydroxyethyl) nitrone,
α-iso-propyl-α-[2-(5-nitro-2-furyl)vinyl]-N-(2-hydroxypropyl) nitrone,
α-iso-propyl-α-[2-(5-nitro-2-furyl)vinyl]-N-[2-hydroxy-1-(hydroxymethyl)ethyl]nitrone,
α-iso-propyl-α-(5-nitro-2-furyl)-N-(2-furfuryl) nitrone,
α-iso-propyl-α-[2-(5-nitro-2-furyl)vinyl]-N-(2-furfuryl) nitrone,
α-n-butyl-α-(5-nitro-2-furyl)-N-methyl nitrone,
α-n-butyl-α-(5-nitro-2-furyl)-N-(2-hydroxypropyl) nitrone,
α-n-butyl-α-(5-nitro-2-furyl)-N-(2-hydroxyethyl) nitrone,
α-n-butyl-α-(5-nitro-2-furyl)-N-(1-methyl-2-hydroxyethyl) nitrone,
α-n-butyl-α-[2-(5-nitro-2-furyl)vinyl]-N-methyl nitrone,
α-n-butyl-α-[2-(5-nitro-2-furyl)vinyl]-N-(2-hydroxyethyl) nitrone,
α-n-butyl-α-[2-(5-nitro-2-furyl)vinyl]-N-(1-methyl-2-hydroxyethyl) nitrone,
α-n-butyl-α-[2-(5-nitro-2-furyl)vinyl]-N-(2-hydroxypropyl) nitrone,
α-n-butyl-α-[2-(5-nitro-2-furyl)vinyl]-N-[2-hydroxy-1-(hydroxymethyl)ethyl]nitrone,
α-n-butyl-α-(5-nitro-2-furyl)-N-(2-furfuryl) nitrone,
α-n-butyl-α-[2-(5-nitro-2-furyl)vinyl]-N-(2-furfuryl) nitrone,
α-iso-butyl-α-(5-nitro-2-furyl)-N-methyl nitrone,
α-iso-butyl-α-(5-nitro-2-furyl)-N-ethyl nitrone,
α-iso-butyl-α-(5-nitro-2-furyl)-N-(2-hydroxypropyl) nitrone,
α-iso-butyl-α-(5-nitro-2-furyl)-N-(2-hydroxyethyl) nitrone,
α-iso-butyl-α-(5-nitro-2-furyl)-N-(1-methyl-2-hydroxyethyl) nitrone,
α-iso-butyl-α-[2-(5-nitro-2-furyl)vinyl]-N-methyl nitrone,
α-iso-butyl-α-[2-(5-nitro-2-furyl)vinyl]-N-(2-hydroxyethyl) nitrone,
α-iso-butyl-α-[2-(5-nitro-2-furyl)vinyl]-N-(1-methyl-2-hydroxyethyl) nitrone,
α-iso-butyl-α-[2-(5-nitro-2-furyl)vinyl]-N-(2-hydroxypropyl) nitrone,
α-iso-butyl-α-[2-(5-nitro-2-furyl)vinyl]-N-[2-hydroxy-1-(hydroxymethyl)ethyl] nitrone,
α-iso-butyl-α-(5-nitro-2-furyl)-N-(2-furfuryl) nitrone and
α-iso-butyl-α-[2-(5-nitro-2-furyl)vinyl]-N-(2-furfuryl) nitrone.

According to the present invention, the novel compounds can be easily prepared by contacting a carbonyl compound represented by the general formula:

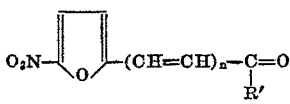

(wherein n and R' have the above-defined meanings) with an N-substituted hydroxylamine represented by the general formula:

(wherein R has the above-defined meaning).

In this case, by contacting the carbonyl compound with the N-substituted hydroxylamine, a condensation reaction easily proceeds with dehydration. This reaction may be carried out in an organic solvent, such as a lower alcohol, e.g., methanol or ethanol, dioxane, tetrahydrofuran, dimethylsulfoxide and pyridine.

The reaction temperature used differs according to the kinds of the reactants and the solvent used, but generally speaking, a temperature within the range of 10 to 100° C. is preferable. The reaction pressure is a less important factor, and atmospheric pressure is usually preferable.

The N-substituted hydroxylamines, specified in the method of the present invention, are not only the free forms, but also salt forms with mineral acids can be utilized. As such salts of mineral acid, the hydrochloride, sulphate etc., can be utilized. In the case a salt of a mineral acid is used, it is desirable that a base in an amount sufficient to neutralize the acid, such as an inorganic base, e.g., sodium hydroxide, potassium hydroxide, sodium bicarbonate, potassium bicarbonate, sodium carbonate or potassium carbonate, or an organic base, e.g., sodium acetate, pyridine or triethylamine, be added to the reaction system.

The important features of the present invention consist in the discovery that a carbonyl derivative of nitrofuran readily reacts with an N-substituted hydroxylamine to form novel nitrone derivatives and that these novel nitrone derivatives have greater antimicrobial activities when compared with such Schiff bases as known N-substituted (5-nitro-2-furfurylidene) amine derivatives similar in chemical structure to the compounds of the present invention. In addition, the compounds of the present invention are superior to the Schiff bases in their solubilities in water and organic solvents so that they are more advantageous in application for liquid medicines.

The novel compounds of the present invention are remarkably effective against diseases due to micro-organisms such as bacteria, fungi and protozoa. Since they have a strong activity, a relatively small dose is sufficient, and the toxicity is less than those of known nitrofuran derivatives. They can be applied to human beings and other animals as an internal medicine, external medicine or an injection in the present form, in the form of a solution, or together with an adjuvant, carrier or vehicle. Further, it is to be understood that the compounds of the present invention are widely applicable to the fields of food, agriculture, etc. where the removal or prevention of increase of micro-organisms is required.

The present invention will now be described by the following non-limiting examples:

Example 1

(A) A mixture of 1.55 g. of 5-nitro-2-furyl methylketone, 1.0 g. of N-methylhydroxylamine hydrochloride and 1.0 g. of pyridine in 20 ml. of ethanol was refluxed for 2 hours on a steam bath. After evaporation of the solvent, the residue was cooled to form orange crystals which were collected by filtration and recrystallized from ethanol to give 1.3 g. of α-methyl-α-(5-nitro-2-furyl)-N-methylnitrone as reddish yellow needles melting at 179–180° C.

(B) A use of 10 ml. of only pyridine, in place of ethanol under (A) above mentioned, as both the solvent and the acceptor of hydrogen chloride and the treatment of the reaction mixture by the same manner resulted again in a formation of 1.4 g. of the identical product with that obtained previously under (A).

Example 2

To a solution of 5-nitro-2-furyl methylketone and N-ethylhydroxylamine hydrochloride in ethanol, a solution of anhydrous sodium acetate in water was added. The mixture was heated on a steam bath, and cooled. A resulting precipitate was collected by filtration, washed with water, and recrystallized from ethanol to yield α-methyl-α-(5-nitro-2-furyl)-N-ethylnitrone as yellow needles melting at 158–160° C.

Examples 3 and 4

The following compounds were produced from the reactants set forth below following the procedure of Example 2:

From 5-nitro-2-furyl methylketone and N-(2-hydroxypropyl)-hydroxylamine hydrochloride there was obtained α-methyl-α-(5-nitro-2-furyl)-N-(2-hydroxypropyl)nitrone as yellow needles melting at 150–151.5° C.

From 5-nitro-2-furyl methylketone and N-(2-hydroxyethyl)-hydroxylamine hydrochloride there was obtained α-methyl-α-(5-nitro-2-furyl)-N-(2-hydroxyethyl)nitrone as yellow needles melting at 137–138° C.

Example 5

The present Example explains the excellent antimicrobial activities of the compound of the present invention on the basis of the results of in vivo experiments.

The Table I and Table II summarize in vivo activities of the compound against infection with *Salmonella typhimurium* and *Trichomonas vaginalis* in mice.

Infection with *Salmonella typhimurium*

10 mice were infected intraperitoneally with 0.5 ml. of a bacterial suspension containing 1000 $LD_{50}$ of *Salmonella typhimurium*. 12.5, 25 and 50 mg./kg. of the compound to be tested were administered orally twice a day for 4 days, the first treatment being made immediately after the infection. After 2 weeks' observation, efficacy was expressed by survival rate (survived/tested). The results are shown in Table I.

TABLE I

| Compound | α-methyl-α-(5-nitro-2-furyl)-N-(2-hydroxyethyl) nitrone |
| --- | --- |
| Dose: | |
| 50 mg./kg | |
| 25 mg./kg | 10/10 |
| 12.5 mg./kg | 7/10 |

Infection with *Trichomonas vaginalis*

6 mice were infected intraperitoneally with 0.1 ml. of a protozoal (*Trichomonas vaginalis*) suspension containing $10^7$ cells and administered orally 125 and 250 mg./kg. of the compound to be tested once at 1 hour after the infection. On the 7th day after the infection, mice were sacrificed and the presence of viable protozoa in abscesses produced in intraperitoneal cavity was examined by cultivation. The results are shown in Table II.

TABLE II

| Compound | α-methyl-α-(5-nitro-2-furyl)-N-(2-hydroxyethyl) nitrone |
| --- | --- |
| Dose: | |
| 250 mg./kg | 4/6 |
| 125 mg./kg | |

Example 6

Preparation of cis and trans-α-methyl-α-[2-(5-nitro-2-furyl)vinyl]-N-methyl nitrone.

To a solution of 3.6 of 2-(5-nitro-2-furyl)-vinyl methyl ketone in 60 ml. of ethanol 1.8 g. of N-methyl hydroxyl amine hydrochloride and 1.7 g. of anhydrous sodium acetate were added. The mixture was warmed at 65° C. with stirring for 3 hours. After the mixture was cooled, the crystalline products were collected by filtration and the filtrate was concentrated to a half volume under reduced pressure. The resulting residue, on cooling, gave additional crystals which were combined with the preceding crystals, and recrystallized fractionally from ethanol to give 2.1 g. of the intended compound of cis-type as dark red prisms melting at 189–191° C. and 1.5 g. of the intended trans-compound as reddish orange prisms melting at 175–177° C.

Example 7

An aqueous, saturated solution of anhydrous sodium acetate was added to the solution of 2-(5-nitro-2-furyl)-vinyl methyl ketone and N-(2-hydroxy propyl) hydroxyl amine hydrochloride. The mixture was allowed to stand for 30 minutes with occasional shaking, warmed on a steam bath for 20 minutes, and thereafter filtered to remove the resulted sodium chloride. After cooling, the resulting crystals were collected by filtration, washed with water and recrystallized to yield α-methyl-α-[2-(5-nitro-2-furyl)vinyl]-N-(2-hydroxy propyl)nitrone as orange needles melting at 158–168° C.

Examples 8–10

Following the procedure of Example 7, the following compounds were prepared from the reactants stated below:

From 2-(5-nitro-2-furyl)vinyl methyl ketone and N-(2-hydroxyethyl)hydroxylamine hydrochloride there was obtained α-methyl-α-[2-(5-nitro-2-furyl)vinyl]-N-(2-hydroxyethyl)nitrone as orange needless melting at 160–163° C.

From 2-(5-nitro-2-furyl)vinyl methyl ketone and N-(1-methyl-2-hydroxyethyl) hydroxyl amine hydrochloride there was obtained α-methyl-α-[2-(5-nitro-2-furyl)vinyl]-N-(1-methyl-2-hydroxyethyl)nitrone as orange needles melting at 141–143° C.

From 2-(5-nitro-2-furyl)vinyl methyl ketone and N-[2-hydroxy-1-(hydroxymethyl)ethyl]hydroxyl amine hydrochloride there was obtained α-methyl-α-[2-(5-nitro-2-furyl)vinyl] - N - [2-hydroxy-1-(hydroxymethyl)ethyl] nitrone as orange needles melting at 180–182° C.

Examples 11 and 12

Following the procedure of Example 1, the following compounds were produced from the reactants indicated below:

From 5-nitro-2-furyl methyl ketone and N-(1-methyl-2-hydroxyethyl hydroxyl amine hydrochloride there was obtained α-methyl-α-(5-nitro-2-furyl) - N - (1-methyl-2-hydroxyethyl)nitrone as orange prisms melting at 112–114° C.

From 5-nitro-2-furyl methyl ketone and N-(2-furfuryl) hydroxyl amine hydrochloride there was obtained α-methyl - α-(5-nitro-2-furyl)-N-(2-furfuryl)nitrone as yellow needles melting at 146–147° C.

Example 13

Following the procedure of Example 6, the following compounds were prepared from the reactants indicated below:

From 2-(5-nitro-2-furyl)vinyl methyl ketone and N-(2-furfuryl)hydroxyl amine hydrochloride there was obtained α - methyl-α-[2-(5-nitro-2-furyl)vinyl]-N-(2-furfuryl)nitrone of cis type as orange needles melting at 157–158° C. and α-methyl-α-[2-(5-nitro-2-furyl)vinyl]-N-(2-furfuryl) nitrone of trans type as reddish orange needles melting at 140–141° C.

What is claimed is:

1. A nitrone derivative of the formula

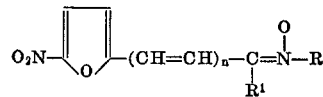

wherein $n$ is 0 or 1, $R^1$ is alkyl of 1 to 4 carbon atoms, R is a member selected from the group consisting of $A-(OH)_m$ and $A-X$, wherein A is an alkyl having 1 to 6 carbon atoms, X is a member selected from the group consisting of hydrogen and furyl, and $m$ is an integer of 1 to 3 when $n$ is 1 and an integer of 2 or 3 when $n$ is 0.

2. A nitrone derivative of the formula

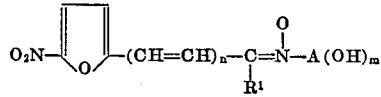

wherein $n$ is 0 or 1, $R^1$ is an alkyl of 1 to 4 carbon atoms, A is an alkyl of 1 to 6 carbon atoms, and $m$ is an integer of 1 to 3 when $n$ is 1 and an integer of 2 or 3 when $n$ is 0.

3. The nitrone derivative of claim 1 wherein said derivative is α-methyl-α-(5-nitro-2-furyl)-N-methyl nitrone.

4. The nitrone derivative of claim 1 wherein said derivative is α-methyl-α-(5-nitro-2-furyl)-N-ethyl nitrone.

5. The nitrone derivative of claim 1 wherein said derivative is α-methyl-α-[2-(5-nitro-2-furyl)vinyl]-N-methyl nitrone.

6. The nitrone derivative of claim 1 wherein said derivative is α-methyl-α-(5-nitro-2-furyl)-N-(2-furfuryl) nitrone.

7. The nitrone derivative of claim 1 wherein said derivative is α-methyl-α-[2-(5-nitro-2-furyl)vinyl]-N-(2-furfuryl) nitrone.

8. The nitrone derivative of claim 2 wherein said derivative is α-methyl - α - [2-(5-nitro-2-furyl)vinyl]-N-(2-hydroxyethyl nitrone.

9. The nitrone derivative of claim 2 wherein said derivative is α - methyl-α-[2-(5-nitro-2-furyl)vinyl]-N-(1-methyl-2-hydroxyethyl) nitrone.

10. The nitrone derivative of claim 2 wherein said derivative is α-methyl-α[2(5-nitro-2-furyl)vinyl]-N-(2-hydroxypropyl) nitrone.

11. The nitrone derivative of claim 2 wherein said derivative is α-methyl-α[2(5-nitro-2-furyl)vinyl]-N-(2-hydroxy-1-(hydroxymethyl)ethyl] nitrone.

References Cited
UNITED STATES PATENTS

| | | | |
|---|---|---|---|
| 3,666,754 | 5/1970 | Minamie et al. | 260—240 |
| 3,701,773 | 10/1972 | Minamie et al. | 260—240 A |

HENRY R. JILES, Primary Examiner

B. DENTZ, Assistant Examiner

U.S. Cl. X.R.

260—347.7; 424—285